United States Patent
Sundar et al.

(10) Patent No.: US 12,470,643 B2
(45) Date of Patent: Nov. 11, 2025

(54) METHOD AND APPARATUS TO PERFORM OPERATIONS ON MULTIPLE SEGMENTS OF A DATA PACKET IN A NETWORK INTERFACE CONTROLLER

(71) Applicant: Intel Corporation, Santa Clara, CA (US)

(72) Inventors: Naru Dames Sundar, Los Gatos, CA (US); Chih-Jen Chang, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 17/556,089

(22) Filed: Dec. 20, 2021

(65) Prior Publication Data
US 2022/0116487 A1 Apr. 14, 2022

(51) Int. Cl.
*H04L 69/22* (2022.01)
(52) U.S. Cl.
CPC .......... *H04L 69/22* (2013.01); *H04L 2212/00* (2013.01)
(58) Field of Classification Search
CPC ...... H04L 69/22; H04L 2212/00; H04L 69/12
See application file for complete search history.

(56) References Cited

U.S. PATENT DOCUMENTS

| | | | |
|---|---|---|---|
| 9,940,284 B1* | 4/2018 | Davis | G06F 13/4221 |
| 2006/0072563 A1 | 4/2006 | Regnier et al. | |
| 2019/0042522 A1* | 2/2019 | Peleska | H04W 52/02 |
| 2019/0044835 A1 | 2/2019 | Kutch et al. | |
| 2020/0204657 A1* | 6/2020 | Khan | H04L 49/9042 |
| 2021/0043557 A1* | 2/2021 | Lee | H01L 23/5385 |

FOREIGN PATENT DOCUMENTS

CN 109426649 A 3/2019

OTHER PUBLICATIONS

Extended European Search Report for Patent Application No. 22201891.3, Mailed May 9, 2023, 9 pages.

* cited by examiner

*Primary Examiner* — Cheikh T Ndiaye
(74) *Attorney, Agent, or Firm* — Compass IP Law PC (57) ABSTRACT

A stacked memory such as a high bandwidth memory (HBM) with a wide data path is used by a streaming pipeline in a network interface controller to buffer segments of a data packet to allow the network interface controller to perform operations on the packet payload. The headers and packet payload can be scanned and classified concurrently with the buffered payload parsed in parallel.

20 Claims, 7 Drawing Sheets

METHOD AND APPARATUS TO PERFORM OPERATIONS ON MULTIPLE SEGMENTS OF A DATA PACKET IN A NETWORK INTERFACE CONTROLLER

BACKGROUND

The Open Systems Interconnection model (OSI model) is a conceptual model that partitions a communication system into abstraction layers. In addition to a payload field and a checksum, a data packet can include a header for each of the seven layers of the OSI model, a physical layer (L1) header, a data link layer header, a networking layer (L3) header, a transport layer (L4) header, a session layer (L5) layer header, a presentation layer (L6) header and an application layer (L7) header.

A packet processing engine in a streaming pipeline accesses a small portion of a data packet, typically just the first N bytes (for example, L3-L1 headers). However, applications such as Deep Packet Inspection (DPI), transport offload and Transport Layer Security (TLS) offload need to access other portions of the data packet. These types of applications are becoming more critical to networking use-cases such as microservices.

BRIEF DESCRIPTION OF THE DRAWINGS

Features of embodiments of the claimed subject matter will become apparent as the following detailed description proceeds, and upon reference to the drawings, in which like numerals depict like parts, and in which

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

A large amount of memory is needed to buffer a large payload to allow a streaming pipeline to access any portion of the data packet as the data packet is received and transmitted. A stacked memory such as a high bandwidth memory (HBM) with a wide data path is used by the streaming pipeline in a Network Interface Controller to buffer segments of the data packet to allow the network interface controller to perform operations on the packet payload. The use of high bandwidth memory by the streaming pipeline allows the network interface controller to perform Transport Level Security (TLS) offload, full protocol stack offload, whole-packet classification, in-pipeline layer 7 processing, and deep packet inspection and custom transport protocols. The headers and packet payload can be scanned and classified concurrently with the buffered payload parsed in parallel. Packet parsing may include the use of programmable packet parsers and parsing programmable languages such as Programming Protocol-independent Packet Processors (P4) or Networking Programming Language (NPL).

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1A:
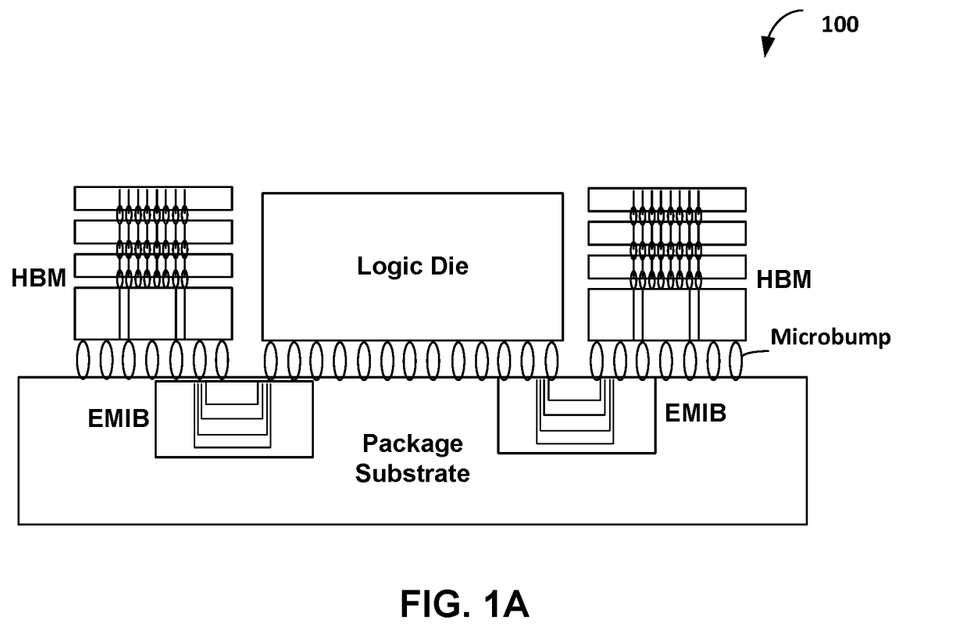
FIG. 1A is a block diagram of a multi-chip package that includes a logic die, High Bandwidth Memory (HBM) and an Embedded Multi-die Interconnect Bridge (EMIB)

FIG. 1A is a block diagram of a multi-chip package 100 that includes a logic die, High Bandwidth Memory (HBM) and an Embedded Multi-die Interconnect Bridge (EMIB). The logic die can be a System on Chip (SoC) or a Network Interface Controller (NIC).

Figure 1B:
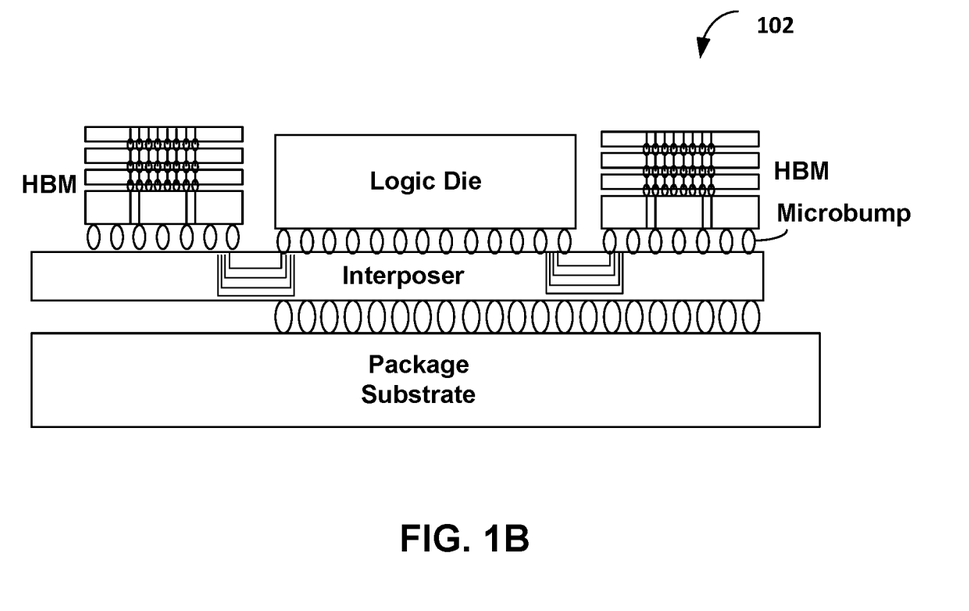
FIG. 1B is a block diagram of a multi-chip package that includes a logic die, HBM and an interposer.

A plurality of bumps (also referred to as solder bump, microbumps, or ball) provide contact between I/O pins on the logic die and I/O pins on the HBM to the package substrate. The EMIB is embedded in the package substrate below the edges of the logic die and the HBM die and includes routing layers to connect I/O pins from the logic die to I/O pins on the HBM die via the micro-bumps on the logic die and the HBM die.

a. FIG. 1B is a block diagram of a multi-chip package 102 that includes a logic die, HBM and an interposer. The logic die can be a System on Chip (SoC) or a Network Interface Controller (NIC).

A plurality of bumps provide contact between I/O pins on the logic die and I/O pins on the HBM to the interposer. The logic die and HBM die are placed side by side on top of an interposer that includes through-silicon vias (TSVs). The interposer acts as a bridge between the logic die and HBM die and a printed circuit board (PCB).

HBM is a high-speed memory interface for 3D-stacked Synchronous Dynamic Random Access Memory (SDRAM). High Bandwidth Memory (HBM) may be compatible with HBM (HBM, JESD235, originally published by JEDEC (Joint Electronic Device Engineering Council) in October 2013), HBM2 (HBM version 2, JESD235C, originally published by JEDEC in January 2020), or HBM3 (HBM version 3 currently in discussion by JEDEC). A HBM die with a stack of four SDRAM dies has two 256-bit channels per die for a total of 8 channels and a data bus width of 1024 bits.

Figure 2:
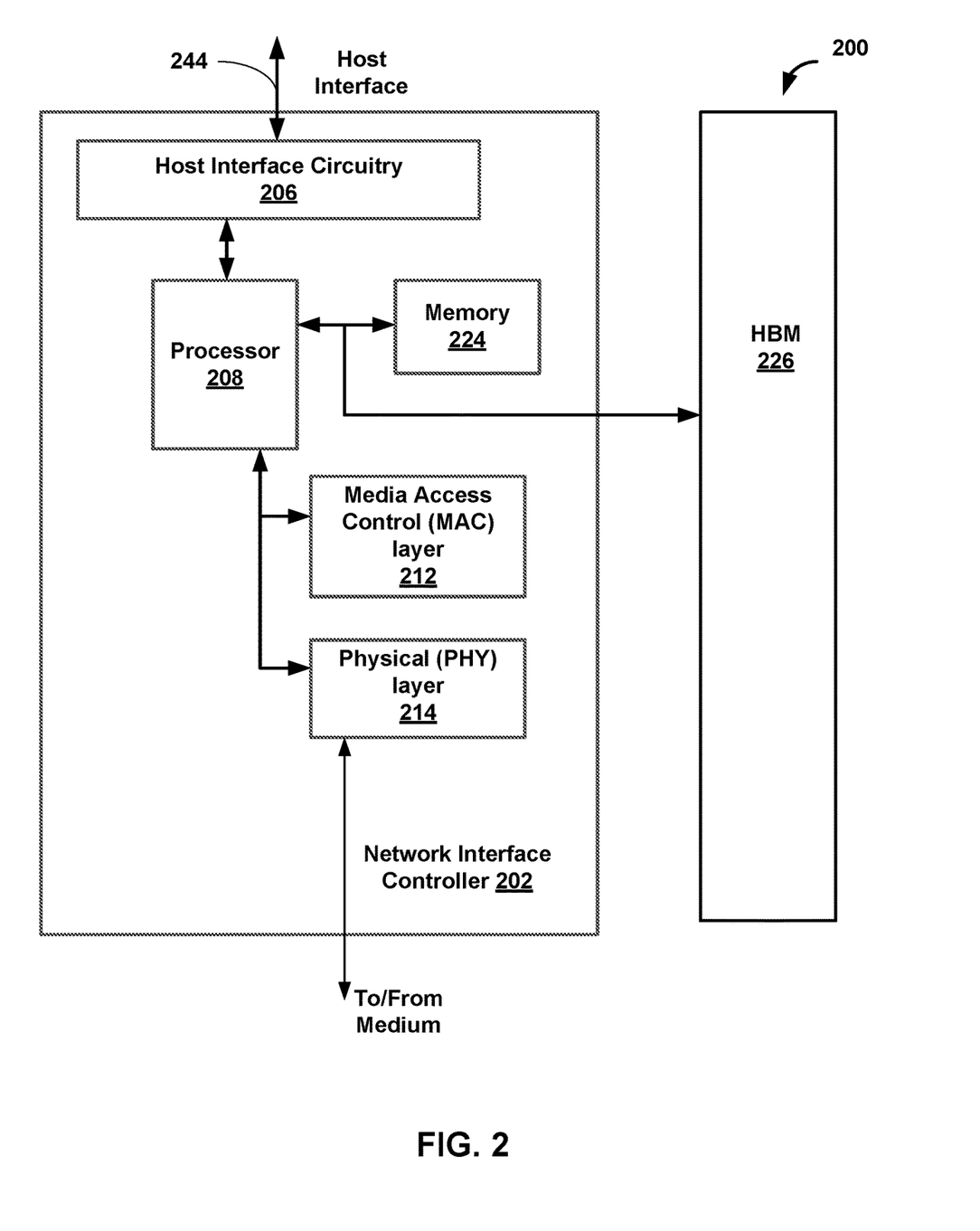
FIG. 2 is a block diagram of a multi-chip package that includes a network interface controller and HBM that can be in the multi-chip package in FIG. 1A or multi-chip package in FIG. 1B to buffer segments of a data packet to allow a streaming pipeline in the network interface controller to perform operations on the packet payload.

FIG. 2 is a block diagram of a multi-chip package 200 that includes a network interface controller 202 and HBM 226 that can be the multi-chip package 100 (FIG. 1A) or the multi-chip package 102 (FIG. 1B) to buffer segments of a data packet to allow a streaming pipeline in the network interface controller 202 to perform operations on the data packet payload. Streaming can refer to data movement and transformation operations performed in the network interface controller 202.

HBM 226 is stacked High Bandwidth Memory with a stack of SDRAM dies as discussed in conjunction with FIG. 1A and FIG. 1B.

Headers in the data packet payload are processed by the streaming pipeline in a pipelined fashion. The network interface controller 202 includes host interface circuitry 206, a processor 208, media access control (MAC) layer circuitry 212, physical (PHY) layer circuitry 214, and a local memory 224.

The Media Access Control layer circuitry 212 includes a plurality of full duplex Ethernet layer ports. In an embodiment there can be four full duplex Ethernet layer ports and the Media Access Control layer circuitry 212 uses the Ethernet protocol.

The physical (PHY) layer circuitry 214 (PHY circuitry) provides the plurality of Ethernet ports with integrated PHY interfaces to connect directly to a medium or to external PHYs. In an embodiment with four full duplex Ethernet MAC ports, the physical PHY layer circuitry 214 can support eight physical high speed SerDes lanes, two per Ethernet layer port.

The host interface circuitry 206 is communicatively coupled over bus 244 to a host interface. In an embodiment, the host interface circuitry 206 may include a Peripheral Component Interconnect Express (PCIe) adapter that is communicatively coupled over bus 244 using the Peripheral Component Interconnect Express (PCIe) protocol to a host. The PCIe standards are available at www.pcisig.com.

Figure 3:
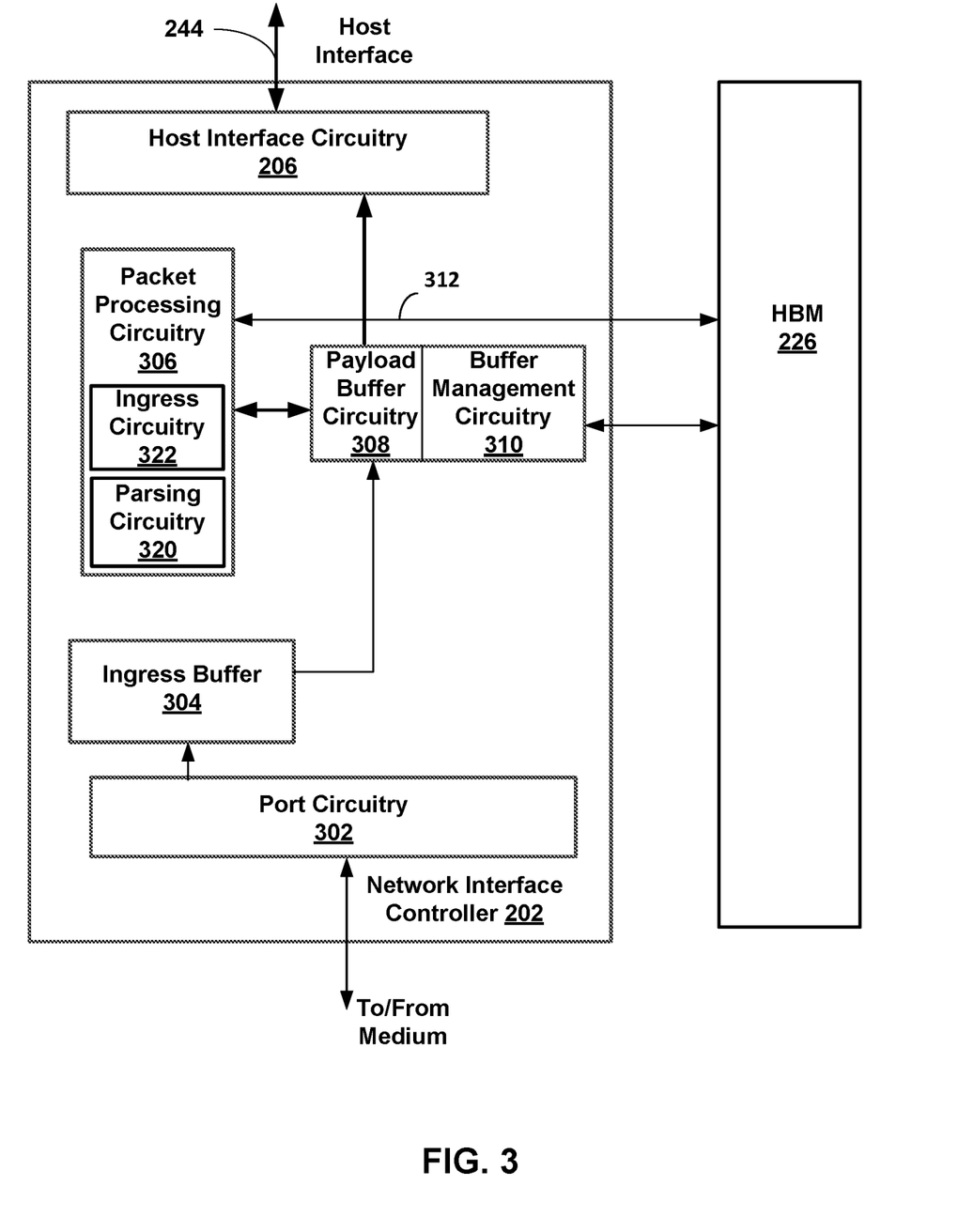
FIG. 3 is a block diagram that includes circuitry in the network interface controller to process data packets received by the network interface controller.

FIG. 3 is a block diagram that includes circuitry in the network interface controller 202 to process data packets received by the network interface controller 202. The network interface controller 202 uses both a streaming pipeline and HBM 226 to process data packets received by port circuitry 302. The streaming pipeline includes packet processing circuitry 306 that can write segments into the HBM 226. A segment is a portion of the data packet. The size of the segment is dependent on the width of the data path in the network interface controller 202.

The circuitry to process received data packets includes ingress buffer 304, packet processing circuitry 306, payload buffer circuitry 308 and buffer management circuitry 310. Buffer management circuitry 310 allocates memory in the HBM 226 for use by the network interface controller 202. The buffer management circuitry 310 performs memory management of the allocated memory in the HBM 226.

A data packet includes a plurality of segments. Each of the plurality of segments is received from the medium by port circuitry 302 and buffered in the ingress buffer 304. The first segment of the data packet is sent from the ingress buffer 304 to the payload buffer circuitry 308. The packet processing circuitry 306 reads the first segment of the data packet from the payload buffer circuitry 308 and inspects the headers in the first segment of the data packet. Based on the inspection of the first segment, the packet processing circuitry 306 determines whether to inspect and perform operations on other segments of the received data packet. If the packet processing circuitry 306 is not to perform operations on other segments of the data packet, the other segments of the data packet are streamed directly from port circuitry 302 via the ingress buffer 304 and the payload buffer circuitry 308 to the host interface circuitry 206.

If operations are to be performed on other segments of the received data packet or packet processing circuitry 306 determines whole-packet flow is required, the packet processing circuitry 306 writes per-flow metadata (for example, policy related identifiers) to HBM 226. For example, whole-packet flow can be based on policy. In a data server with multiple tenants, the policy for a tenant can be to perform Deep Packet Inspection (DPI) for each received data packet associated with the tenant.

To perform whole-packet flow processing or processing on a portion of the received data packet (for example, one or more segments in the data packet that may not be contiguous in the received packet), the packet processing circuitry 306 writes the updated first segment and a reinsertion tag (for example, REINSERT_ALL_SEGs) to the payload buffer circuitry 308. For a received data packet with N segments, Segments 2 . . . N are buffered in ingress buffer 304 and sent to the payload buffer circuitry 308. The segments stored in the payload buffer circuitry are written to the HBM 226.

After the last segment (segment N) of the data packet has been received by the network interface controller 202 (also referred to as the end of packet (EOP) has been detected), the payload buffer circuitry 308 checks the reinsertion tag, and the buffer management circuitry 310 reads segments 1-N from HBM 226 and streams segments 1-N into the host interface circuitry 206.

When processing the entire data packet, each segment 1-N is streamed through packet processing circuitry 306 and back to the payload buffer circuitry 308. The local buffer streams the received segments 1-N to the HBM 226 until the end of packet is detected. After the entire data packet has been received by the network interface controller 202, the payload buffer circuitry 308 streams the segments stored in HBM 226 to the host interface circuitry 206.

Packet processing circuitry 306 that processes whole packets (for example, a crypto function) streams all segments 1-N of the data packet after detecting end of packet to the host interface circuitry 206 or to another accelerator in the network interface controller 202.

Packet processing circuitry 306 that performs processing on headers in the packet processes the packet data one segment at a time, with metadata indicating a current offset in the packet. Per-packet state (context related to the current data packet) can be written from any segment.

Header processing for processing headers in a data packet has a well-known classification model. That is, given a known header, rules can be created that match a header and an offset in the data packet. However, for deep packet processing, a relevant record can be midway through a data packet at an arbitrary offset, and may straddle data path segments.

Deep Packet Inspection (DPI) can be performed by the packet processing circuitry 306 in the network interface controller 202 for a received packet that is stored in the HBM 226. A multi-segment data packet stored in the HBM 226 is transferred to the packet processing circuitry 306 over a packet processing circuitry data path 312. The width of the packet processing circuitry data path 312 is H bits. H bits is a portion of the data packet that can be dependent on the width of the packet processing circuitry data path 312 and the width of the HBM 226 data path. The width of the HBM 226 data path can be 1024 bits. Parsing circuitry 320 in packet processing circuitry 306 parses each H-bit segment received to locate a starting token T and returns a token offset S to packet processing circuitry 306.

After the data packet has been processed by the parsing function, a portion of the multi-segment data packet stored in the HBM 226 is transferred again to the packet processing circuitry 306 over a packet processing circuitry data path 312. Ingress circuitry 322 in the packet processing circuitry 306 streams H sized chunks of the data packet stored in HBM 226 over the packet processing circuitry data path 312 starting at the token offset S. This enables classifiers in the packet processing circuitry 306 to use existing fixed length matching mechanisms.

Figure 4:
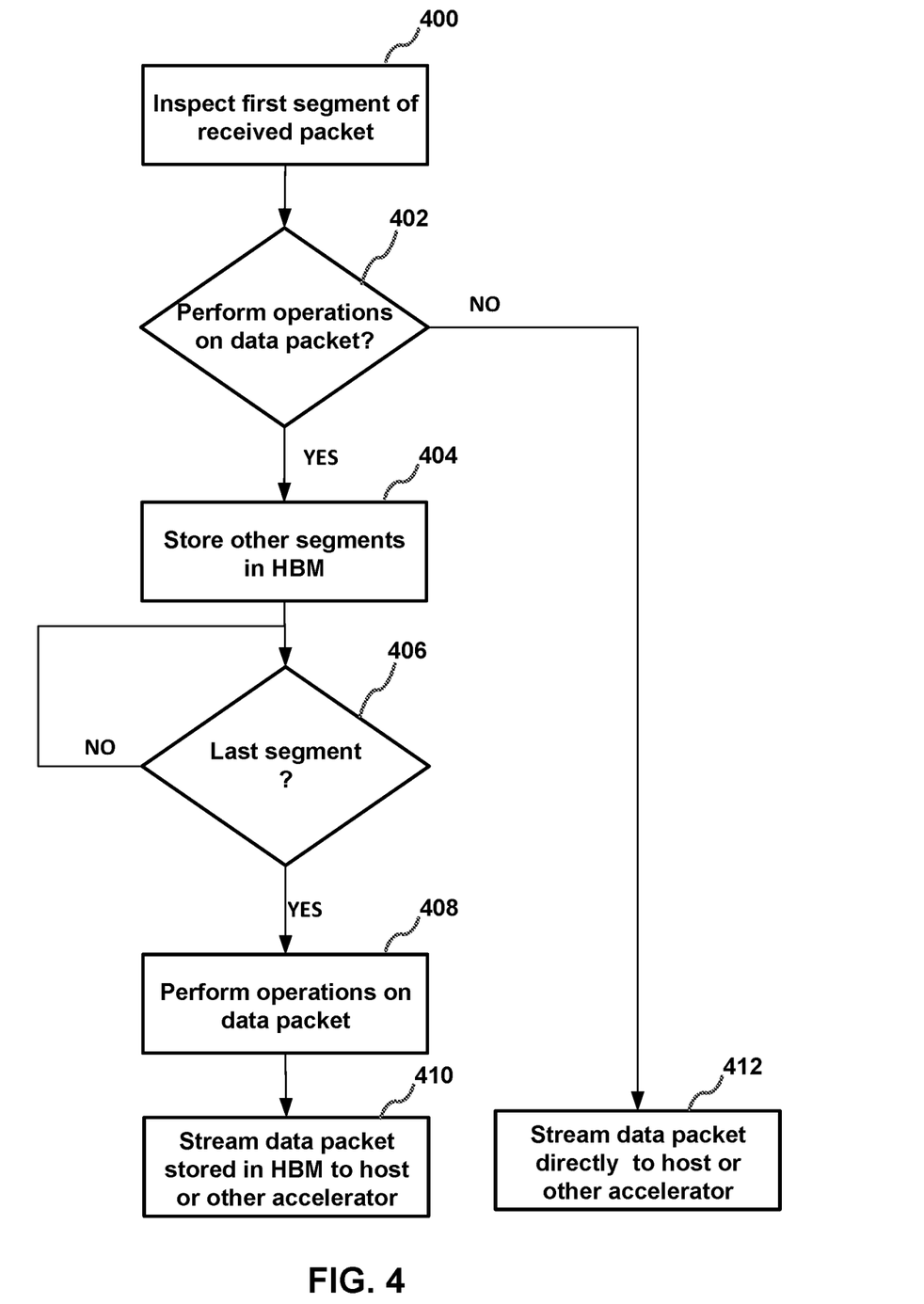
FIG. 4 is a flow graph illustrating a method for processing data packets received from the network by the port circuitry in the network interface controller.

FIG. 4 is a flow graph illustrating a method for processing data packets received from the network by the port circuitry 302 in the network interface controller 202.

At block 400, packet processing circuitry 306 inspects the headers in the first segment of the received data packet.

At block 402, Based on the inspection of the first segment, the packet processing circuitry 306 determines whether to inspect and perform operations on other segments of the received data packet. If the packet processing circuitry 306 is not to perform operations on other segments of the data packet, processing continues with block 412.

At block 404, the segments are stored in the payload buffer circuitry 308 and are written to the HBM 226.

At block 406, if the last segment has been received, processing continues with block 408. If not, processing continues with block 404.

At block 408, each segment 1-N is streamed through packet processing circuitry 306 to perform operations on the data packet and back to the payload buffer circuitry 308.

At block 410, the payload buffer circuitry 308 streams the segments to the host interface circuitry 206 or another accelerator.

At block 412, the other segments of the data packet are streamed directly from port circuitry 302 via the ingress buffer 304 and the payload buffer circuitry 308 to the host interface circuitry 206.

Figure 5:
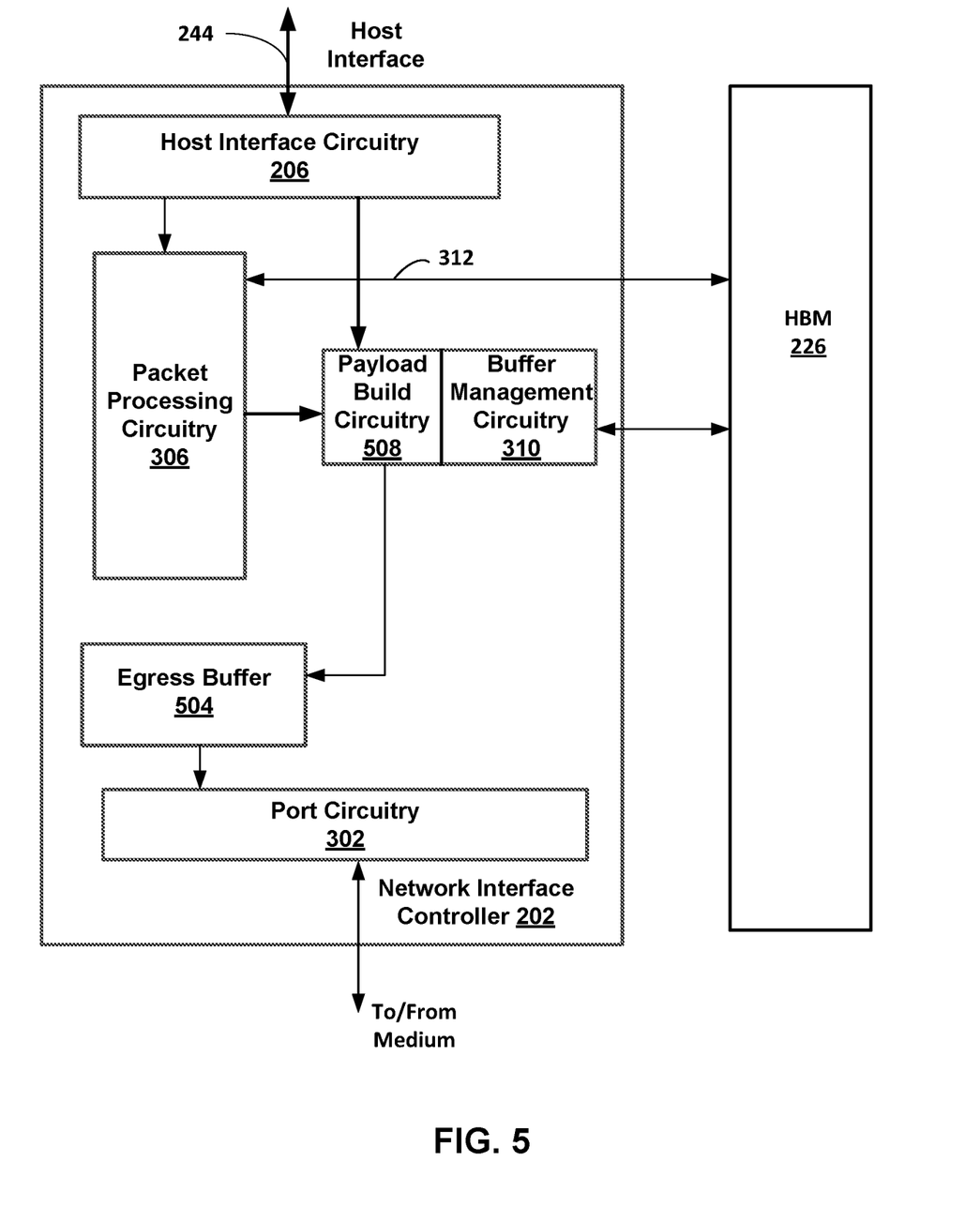
FIG. 5 is a block diagram that includes circuitry in the network interface controller to process data packets transmitted by the network interface controller.

FIG. 5 is a block diagram that includes circuitry in the network interface controller 202 to process data packets transmitted by the network interface controller 202.

The host interface circuitry 206 receives a first segment of a data packet to be transmitted from the network interface controller 202. The host interface circuitry 206 forwards the first segment to packet processing circuitry 306. The packet processing circuitry 306 processes the first segment, if the packet processing circuitry 306 determines from the first segment that whole-packet flow is not required, packet processing circuitry 306 forwards the first segment to payload build circuitry 508. Payload build circuitry 508 fetches any further packet segments via host interface circuitry 206, if needed and adds the segments to the data packet. When the data packet is ready to be transmitted from the network interface controller 202, payload build circuitry 508 forwards the data packet to the egress buffer 504. Data is forwarded to the medium (network) from the egress buffer 504. If whole-packet flow is not required, the data packet is streamed via host interface circuitry, payload build circuitry 508, egress buffer 504 and port circuitry 302.

If packet processing circuitry 306 determines for example, from a header in the first segment to be transmitted that whole-packet flow is required, packet processing circuitry 306 writes per-flow metadata to HBM 226. Packet processing circuitry 306 returns the updated first segment and a reinsertion tag set to "REINSERT_ALL_SEGS". The updated first segment can include a checksum and data inserted by the packet processing circuitry 306.

The payload build circuitry 508 receives the first segment with the reinsertion tag, and requests that the packet processing circuitry 306 write segments 2 . . . N to HBM 226. The host interface circuitry 206 sends SEGMENT_READY to payload build circuitry 508 for each segment that is written to HBM 226.

For whole-packet processing, the local buffer waits to receive all segments (segments 1-N) for the data packet before streaming the segments that are stored in HBM 226 into the egress buffer 504.

For segment specific processing, the local buffer streams segments received from host interface circuitry 206 from payload build circuitry 508 into the egress buffer 504.

After receiving the last segment for the data packet, payload build circuitry 508 performs any further whole packet operations (for example, checksum operations and length field updates) and sends all segments to the egress buffer 504.

The data packet can be edited by the packet processing circuitry 306, the packet editing can result in an increase in the size of a segment in the data packet. When packet editing on a segment increases the size of the segment, the local buffer handles splitting segments that have increased in size into one or more segments, streaming these into the HBM 226, and updating the segment chain.

Length fields in the header stack of the data packet are updated by maintaining a metadata list of fields in preceding segments that contain lengths. The metadata list of fields can be stored in the Network Interface Controller 202 on-die because the number of lists is proportional to the loop latency of processing payloads in the Network Interface Controller 202. During EOP, the metadata list of fields can be used by the payload build circuitry 508 to update length fields along with any checksum operations the payload build circuitry 508 is performing.

Figure 6:
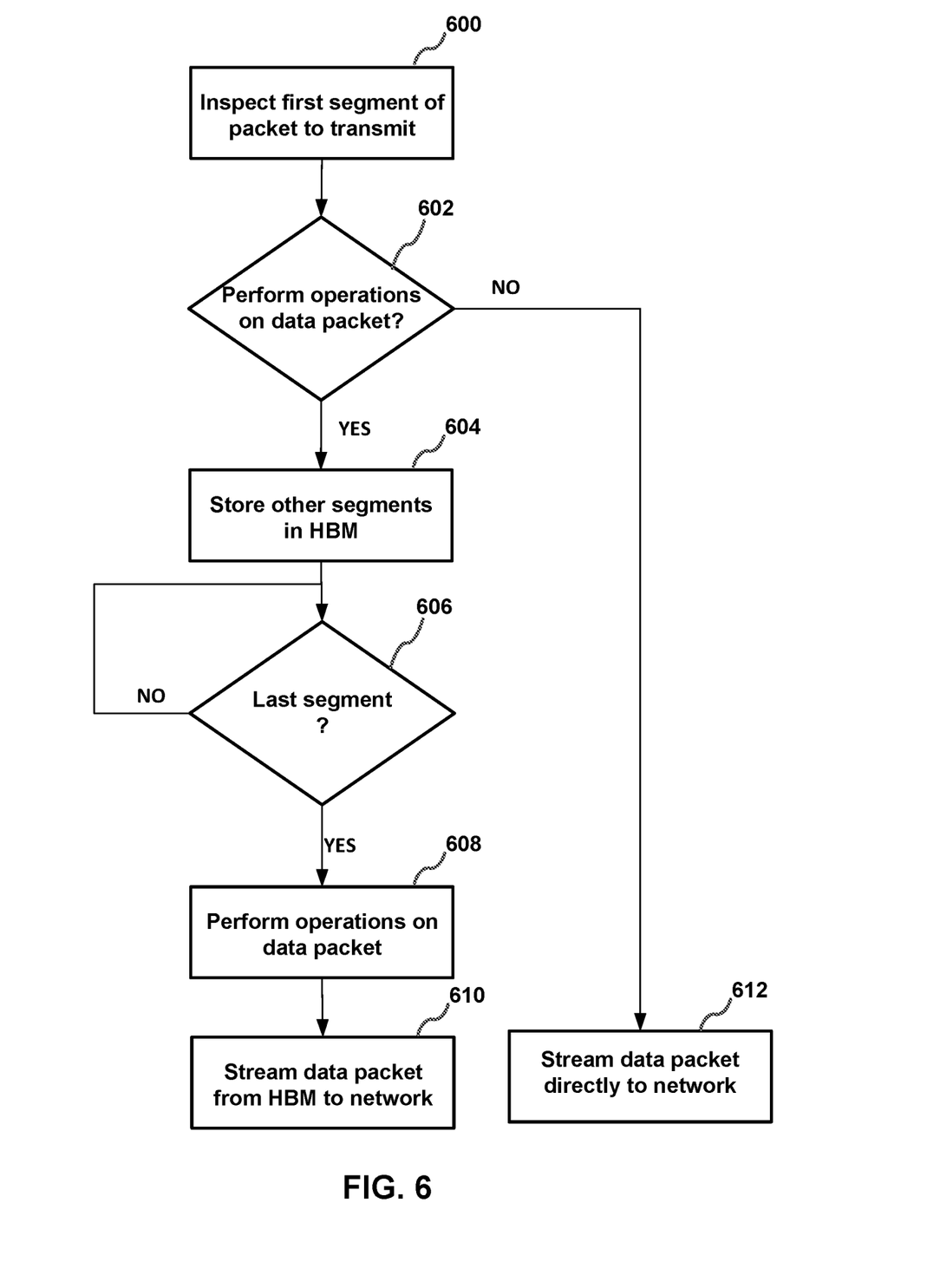
FIG. 6 is a flow graph illustrating a method for processing data packets received by host interface circuitry in the network interface controller to be transmitted by the port circuitry in the network interface controller to the network.

FIG. 6 is a flow graph illustrating a method for processing data packets received by host interface circuitry 206 in the network interface controller 202 to be transmitted by the port circuitry 302 in the network interface controller to the network.

At block 600, packet processing circuitry 306 inspects the headers in the first segment of the data packet to be transmitted.

At block 602, based on the inspection of the first segment, the packet processing circuitry 306 determines whether to inspect and perform operations on other segments of the data packet to be transmitted. If the packet processing circuitry 306 is not to perform operations on other segments of the data packet, processing continues with block 612.

At block 604, the segments are stored in the payload build circuitry and are written to the HBM 226.

At block 606, if the last segment has been received, processing continues with block 608. If not, processing continues with block 604.

At block 608, each segment 1-N is streamed through payload build circuitry 508 to perform operations on the data packet and back to the payload build circuitry 508.

At block 610, the payload build circuitry 508 streams the segments to the port circuitry 302 via the payload build circuitry 508 and the egress buffer 504 to the network.

At block 612, the other segments of the data packet are streamed directly to port circuitry 302 via the payload build circuitry 508 and the egress buffer 504 to the network.

Figure 7:
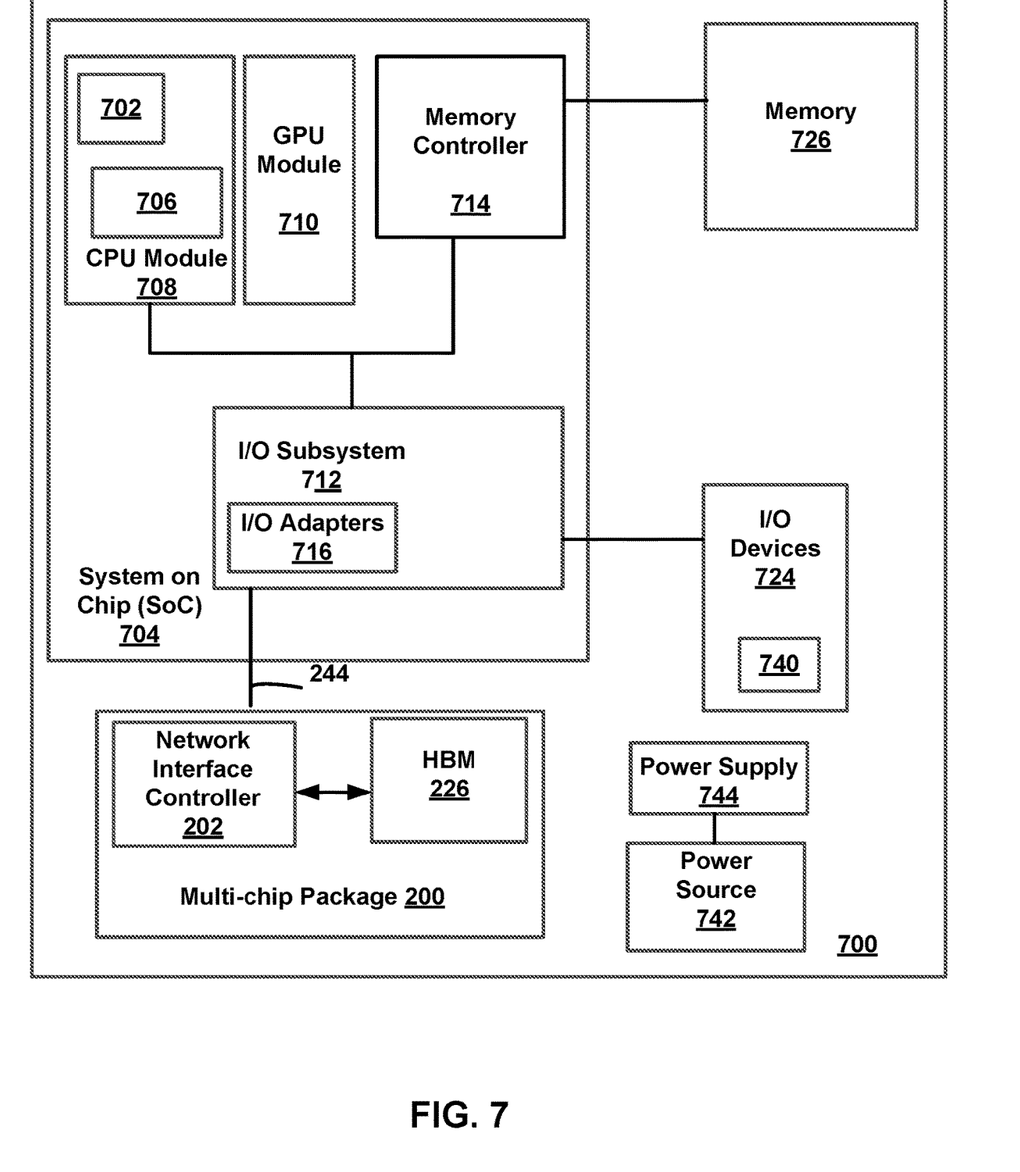
FIG. 7 is a block diagram of an embodiment a computer system that includes the multi-chip package that includes network interface controller and HBM.

FIG. 7 is a block diagram of an embodiment a computer system 700 that includes the multi-chip package 200 that includes network interface controller 202 and HBM 226. Computer system 700 may correspond to a computing device including, but not limited to, a server, a workstation computer, a desktop computer, a laptop computer, and/or a tablet computer.

The computer system 700 includes a system on chip (SOC or SoC) 704 which combines processor, graphics, memory, and Input/Output (I/O) control logic into one SoC package. The SoC 704 includes at least one Central Processing Unit (CPU) module 708, a memory controller 714, and a Graphics Processor Unit (GPU) 710. In other embodiments, the memory controller 714 may be external to the SoC 704. The CPU module 708 includes at least one processor core 702 and a level 2 (L2) cache 706.

Although not shown, each of the processor core(s) 702 may internally include one or more instruction/data caches, execution units, prefetch buffers, instruction queues, branch address calculation units, instruction decoders, floating point units, retirement units, etc. The CPU module 708 may correspond to a single core or a multi-core general purpose processor, such as those provided by Intel® Corporation, according to one embodiment.

The Graphics Processor Unit (GPU) 710 may include one or more GPU cores and a GPU cache which may store graphics related data for the GPU core. The GPU core may internally include one or more execution units and one or more instruction and data caches. Additionally, the Graphics Processor Unit (GPU) 710 may contain other graphics logic units that are not shown in FIG. 7, such as one or more vertex processing units, rasterization units, media processing units, and codecs.

Memory 726 is communicatively coupled to memory controller 714. The memory 726 can be a non-volatile memory, a volatile memory, a tiered memory (with multiple levels of volatile and/or non-volatile memory) or a remote memory.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell (PLC) or some other NAND). A NVM device can also include a byte-addressable, write-in-place three dimensional Crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

Within the I/O subsystem 712, one or more I/O adapter(s) 716 are present to translate a host communication protocol utilized within the processor core(s) 702 to a protocol compatible with particular I/O devices. Some of the protocols that adapters may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapters 716 may include a Peripheral Component Interconnect Express (PCIe) adapter that is communicatively coupled using the PCIe (Peripheral Component Interconnect Express) protocol over bus 244 to the multi-chip package 200. The PCIe standards are available at www.pcisig.com.

The I/O adapter(s) 716 may communicate with external I/O devices 724 which may include, for example, user interface device(s) including a display and/or a touch-screen display 740, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

Power source 742 provides power to the components of computer system 700. More specifically, power source 742 typically interfaces to one or multiple power supplies 744 in computer system 700 to provide power to the components of system 700. In one example, power supply 744 includes an AC to DC (alternating current to direct current) adapter to plug into a wall outlet. Such AC power can be a renewable energy power source 742 (for example, solar power). In one example, power source 742 includes a DC power source, such as an external AC to DC converter. In one example, power source 742 or power supply 744 includes wireless charging hardware to charge via proximity to a charging field. In one example, power supply 744 can include an internal battery or fuel cell source.

It is envisioned that aspects of the embodiments herein can be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities can typically employ large data centers with a multitude of servers.

Cloud computing provides access to servers, storage, databases, and a broad set of application services over the Internet. A cloud service provider offers cloud services such as network services and business applications that are hosted in servers in one or more data centers that can be accessed by companies or individuals over the Internet. Hyperscale cloud-service providers typically have hundreds of thousands of servers. Each server in a hyperscale cloud includes storage devices to store user data, for example, user data for business intelligence, data mining, analytics, social media and micro-services. The cloud service provider generates revenue from companies and individuals (also referred to as tenants) that use the cloud services.

Disaggregated computing or Composable Disaggregated Infrastructure (CDI) is an emerging technology that makes use of high bandwidth, low-latency interconnects to aggregate compute, storage, memory, and networking fabric resources into shared resource pools that can be provisioned on demand. Computer system 700 can be a disaggregated platform.

An Infrastructure Processing Unit (IPU) is a programmable network device that intelligently manages system-level resources by securely accelerating networking and storage infrastructure functions in a disaggregated computing system data center. Systems can be composed differently based at least on how functions are mapped and offloaded.

Infrastructure Processing Units (IPUs) can be used by CSPs for performance, management, security and coordination functions in addition to infrastructure offload and communications. For example, IPUs can be integrated with smart NICs and storage or memory (for example, on a same die, system on chip (SoC), or connected dies) that are located at on-premises systems, base stations, gateways, neighborhood central offices, and so forth. An IPU (also referred to as a Data Processing Unit (DSP)) can be integrated with NIC 202.

Each blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board. These components can include the components discussed earlier in conjunction with FIG. 3 and FIG. 5.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A computing device comprising:
a package comprising:
a stacked High Bandwidth Memory (HBM)-consistent memory; and
a network interface controller (NIC) communicatively coupled to the memory, the NIC comprising:
an ingress buffer;
a payload buffer circuitry;
a host interface; and
packet processing circuitry to:
inspect a first segment of a data packet to determine whether to stream a second segment of the data packet or to store the first segment and the second segment of the data packet in the memory to perform operations on the first segment and the second segment of the data packet, and based on a determination to stream the second segment of the data packet, the packet processing circuitry is to copy the second segment of the data packet from port circuitry via the ingress buffer and the payload buffer circuitry to the host interface.

2. The computing device of claim 1, wherein the NIC is coupled to the memory by a wide data path that is 1024 bits in width.

3. The computing device of claim 1, wherein the first segment of the data packet is received by port circuitry in the NIC.

4. The computing device of claim 1, wherein the first segment of the data packet is received by host interface circuitry in the NIC.

5. The computing device of claim 1, wherein the package comprises a multi-chip package and wherein a first die includes the memory and a second die includes the NIC and a multi-chip package includes the first die and the second die.

6. The computing device of claim 1, wherein if the first segment indicates that the operations are not to be performed on the data packet, the second segment of the data packet is streamed directly to port circuitry or host interface circuitry in the NIC.

7. The computing device of claim 1, wherein:
based on a determination to store the first segment and the second segment of the data packet in the HBM-consistent memory to perform operations on the first segment and the second segment of the data packet, the packet processing circuitry is to: copy the second segment to the HBM-consistent memory, and if the second segment is a last segment of the data packet, copy the second segment to the packet processing circuitry to process the second segment, store the processed second segment in the payload buffer circuitry, and copy the processed second segment to the host interface circuitry.

8. The computing device of claim 1, wherein the first segment comprises a header and the second segment comprises data.

9. The computing device of claim 1, wherein:
the packet processing circuitry is to:
inspect a third segment of the data packet to determine if the third segment is a last segment of the data packet and
based on a determination to store the first segment and the second segment of the data packet in the HBM-consistent memory to perform operations on the first segment and the second segment of the data packet, copy the third segment of the data packet to the HBM-consistent memory, and if the third segment is a last segment of the data packet, copy the third segment to the packet processing circuitry to process the third segment, store the processed third segment in the payload buffer circuitry, and copy the processed third segment to the host interface circuitry.

10. A system comprising:
a multi-chip package comprising:
a stacked High Bandwidth Memory (HBM)-consistent memory; and
a network interface controller (NIC) communicatively coupled to the memory, the NIC comprising:
an ingress buffer;
a payload buffer circuitry;
a host interface; and
packet processing circuitry to inspect a first segment of a data packet to determine whether to stream a second segment of the data packet or to store the first segment and the second segment of the data packet in the memory to perform operations on the first segment and the second segment of the data packet, and based on a determination to stream the second segment of the data packet, the packet processing circuitry is to copy the second segment of the data packet from port circuitry via an ingress buffer and a payload buffer circuitry to a host interface circuitry.

11. The system of claim 10, wherein the NIC is coupled to the memory by a wide data path that is 1024 bits in width.

12. The system of claim 10, wherein the first segment of the data packet is received by port circuitry in the NIC.

13. The system of claim 10, wherein the first segment of the data packet is received by the host interface circuitry.

14. The system of claim 10, wherein if the first segment indicates that the operations are not to be performed on the data packet, the second segment of the data packet are streamed directly to port circuitry or host interface circuitry.

15. A method comprising:
receiving, by packet processing circuitry in a network interface controller (NIC) a first segment of a data packet, wherein a multi-chip package comprises the NIC and a stacked High Bandwidth Memory (HBM)-consistent memory device and the NIC comprises an ingress buffer, a payload buffer circuitry, a host interface, and the packet processing circuitry; and
determining, by the packet processing circuitry, based on an inspection of the first segment of the data packet whether to stream a second segment of the data packet or to store the first segment and the second segment of the data packet in a stacked High Bandwidth Memory (HBM) memory communicatively coupled to the network interface controller to perform operations on the first segment and the second segment of the data packet.

16. The method of claim 15, wherein the NIC is coupled to the memory by a wide data path that is 1024 bits in width.

17. The method of claim 15, wherein the first segment of the data packet is received by port circuitry in the NIC.

18. The method of claim 15, wherein the first segment of the data packet is received by host interface circuitry in the NIC.

19. The method of claim 15, wherein a first die includes the stacked HBM memory and a second die includes the NIC and a multi-chip package includes the first die and the second die.

20. The method of claim 15, wherein if the first segment indicates that the operations are not to be performed on the data packet, the second segment of the data packet are streamed directly to port circuitry or host interface circuitry in the NIC.

* * * * *